US011632246B2

(12) United States Patent
Gray et al.

(10) Patent No.: US 11,632,246 B2
(45) Date of Patent: Apr. 18, 2023

(54) HYBRID KEY DERIVATION TO SECURE DATA

(71) Applicant: International Business Machines Corporation, Armonk, NY (US)

(72) Inventors: Michael W. Gray, Guanaba (AU); Simon D. McMahon, Gold Coast (AU); Narayana Aditya Madineni, Southport (AU); Matthew Green, Ashmore (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 17/137,656

(22) Filed: Dec. 30, 2020

(65) Prior Publication Data

US 2022/0209950 A1 Jun. 30, 2022

(51) Int. Cl.
*H04L 9/30* (2006.01)
*H04L 9/08* (2006.01)
*H04L 9/32* (2006.01)

(52) U.S. Cl.
CPC .............. *H04L 9/30* (2013.01); *H04L 9/085* (2013.01); *H04L 9/0852* (2013.01); *H04L 9/0861* (2013.01); *H04L 9/0894* (2013.01); *H04L 9/3247* (2013.01); *H04L 9/3263* (2013.01)

(58) Field of Classification Search
CPC ......... H04L 9/30; H04L 9/085; H04L 9/0852; H04L 9/0861; H04L 9/0894; H04L 9/3247; H04L 9/3261
See application file for complete search history.

(56) References Cited

U.S. PATENT DOCUMENTS

| 9,660,978 | B1 | 5/2017 | Truskovsky et al. |
| 9,698,986 | B1 * | 7/2017 | Gutoski ................. H04L 9/3093 |
| 9,794,249 | B1 * | 10/2017 | Truskovsky ............ H04L 9/006 |
| 10,425,401 | B1 | 9/2019 | Pecen et al. |
| 10,630,655 | B2 | 4/2020 | Becker et al. |
| 10,742,420 | B1 * | 8/2020 | Griffin .................. H04L 9/0825 |
| 11,343,270 | B1 * | 5/2022 | Carter, Jr. ........... H04L 63/1433 |
| 11,366,897 | B1 * | 6/2022 | Ramanathan ......... H04L 9/3263 |

(Continued)

FOREIGN PATENT DOCUMENTS

| CN | 112152817 A | 12/2020 |
| EP | 3432509 A1 | 1/2019 |
| WO | 20201239591 A1 | 6/2020 |
| WO | 2022142837 A1 | 7/2022 |

OTHER PUBLICATIONS

"NIST's Hybrid Mode Approach to Post-Quantum Computing—why crypto agility is crucial", Utimaco, Sep. 20, 2019, 5 pages, <https://content.hsm.utimaco.com/blog/nists-hybrid-mode-approach-a-transition-step-towards-post-quantum-computing>.

(Continued)

*Primary Examiner* — Darshan I Dhruv
(74) *Attorney, Agent, or Firm* — Randy Tejeda

(57) ABSTRACT

In an approach for securing data, a processor publishes a traditional public key in a traditional certificate and a PQC public key in a PQC certificate. A processor encrypts data with a hybrid shared secret, the hybrid shared secret generated with a key derivation function by using a traditional shared secret based on the traditional public key and a PQC shared secret based on the PQC public key. A processor decrypts the data with the hybrid shared secret based on a traditional private key and a PQC private key. A processor signs the data with a traditional signature followed by a PQC signature.

20 Claims, 11 Drawing Sheets

(56) References Cited

U.S. PATENT DOCUMENTS

| | | | |
|---|---|---|---|
| 2014/0068269 | A1 | 3/2014 | Zhou |
| 2018/0109377 | A1* | 4/2018 | Fu .................. H04L 63/0823 |
| 2019/0245682 | A1* | 8/2019 | Alwen .............. H04L 63/0428 |
| 2019/0319801 | A1 | 10/2019 | Sastry |
| 2019/0319804 | A1 | 10/2019 | Mathew et al. |
| 2020/0082738 | A1 | 3/2020 | Poeppelmann |
| 2020/0259647 | A1* | 8/2020 | Goncalves .............. H04L 9/14 |

OTHER PUBLICATIONS

"Post-Quantum TLS", Microsoft, retrieved from the Internet on Aug. 31, 2020, 3 pages, <https://www.microsoft.com/en-us/research/project/post-quantum-tls/>.

Gray et al., "Certificate Based Security Using Post Quantum Cryptography", U.S. Appl. No. 17/086,510, filed Nov. 2, 2020, 38 pages.

Gray et al., "Post-Quantum Certificate Binding", U.S. Appl. No. 17/108,236, filed Dec. 1, 2020, 39 pages.

Huang, Leilei, "A practical hybrid quantum-safe cryptographic scheme between data centers", Proceedings vol. 11540, Emerging Imaging and Sensing Technologies for Security and Defence V; and Advanced Manufacturing Technologies for Micro- and Nanosystems in Security and Defence III, Sep. 20, 2020, 2 pages, <https://www.spiedigitallibrary.org/conference-proceedings-of-spie/11540/2573558/A-practical-hybrid-quantum-safe-cryptographic-scheme-between-data-centers/10.1117/12.2573558.short?SSO=1>.

Kampanakis et al., "The Viability of Post-Quantum X.509 Certificates", Published 2018, Computer Science, 21 pages.

Meher et al. "Hybrid Solution (ECDHE + NewHope) for PQ Transition", International Journal of Engineering and Advanced Technology (IJEAT), vol. 9 Issue-2, Dec. 2019, 2 pages, <https://www.ijeat.org/wp-content/uploads/papers/v9i2/B3799129219.pdf>.

Mell et al., "The NIST Definition of Cloud Computing", Recommendations of the National Institute of Standards and Technology, Special Publication 800-145, Sep. 2011, 7 pages.

O'Connor et al., "Cryptography In A Postquantum World: Preparing intelligent enterprises now for a secure future", Accenture Labs, 2018, 23 pages, <https://www.accenture.com/_acnmedia/PDF-87/Accenture-809668-Quantum-Cryptography-Whitepaper-v05.pdf>.

Sikeridis et al.,"Post-Quantum Authentication in TLS 1.3: A Performance Study", Network and Distributed Systems Security (NDSS) Symposium 2020, Feb. 23-26, 2020, San Diego, CA, USA, 16 pages, <https://dx.doi.org/10.14722/ndss.2020.24203>.

Kumar et al., "Post Quantum Cryptography(PQC)—An overview (Invited Paper)", Proceedings of the 2020 IEEE High Performance Extreme Computing Conference (HPEC), Sep. 22-24, 2020, Waltham, MA, 9 pages.

International Search Report and Written Opinion for Application No. PCT/CN2021/131487, dated Jan. 26, 2022, 10 pages.

\* cited by examiner

HYBRID KEY DERIVATION TO SECURE DATA

BACKGROUND

The present disclosure relates generally to the field of data encryption and decryption, and more particularly to combining the strengths of both traditional and post quantum cryptographic (PQC) algorithms to secure data at rest in an encoding.

In cryptography, encryption can be the process of encoding information. The encoding process may convert the original representation of the information, known as plaintext, into an alternative form known as ciphertext. Ideally, only authorized parties can decipher a ciphertext back to plaintext and access the original information. In public-key encryption schemes, an encryption key may be published for anyone to use and encrypt messages. However, only the receiving party may have access to the decryption key that enables messages to be read. Quantum computing may utilize properties of quantum mechanics in order to process large amounts of data simultaneously. Quantum computing has been found to achieve computing speeds thousands of times faster than today's super computers.

SUMMARY

Aspects of an embodiment of the present disclosure disclose an approach for securing data. A processor publishes a traditional public key in a traditional certificate and a PQC public key in a PQC certificate. A processor encrypts data with a hybrid shared secret, the hybrid shared secret generated with a key derivation function by using a traditional shared secret based on the traditional public key and a PQC shared secret based on the PQC public key. A processor decrypts the data with the hybrid shared secret based on a traditional private key and a PQC private key. A processor signs the data with a traditional signature followed by a PQC signature.

DETAILED DESCRIPTION

The present disclosure is directed to systems and methods for combining the strengths of traditional and PQC (post quantum cryptographic) algorithms to secure data at rest in an encoding.

Embodiments of the present disclosure recognize a need for using quantum resistant algorithms in conjunction with traditional algorithms within a PKCS7 (Seventh of the Public Key Cryptographic Standards) framework to protect data at rest and ideally without exposing data to the risk that the relatively new PQC algorithms may have as yet undiscovered flaws. Embodiments of the present disclosure disclose combining the strengths of traditional and PQC algorithms to secure data at rest in an encoding (e.g., PKCS7 encoding). Embodiments of the present disclosure disclose using a hybrid key derivation function to generate encryption keys for PKCS7 by combining both traditional (e.g., RSA (Rivest-Shamir-Adleman) and ECDH (Elliptic-curve Diffie-Hellman)) and PQC algorithms. Embodiments of the present disclosure disclose distributing a PQC (e.g., Kyber) public key signed using a PQC (e.g., Dilithium) algorithm in a certificate. Embodiments of the present disclosure disclose a PKCS7 signed envelope where data is signed by a traditional signing algorithm followed by (data+traditional signature) in turn signed by a PQC signature algorithm.

In one embodiment, a sender and a receiver may use PQC key pairs to generate a PQC shared secret. The receiver's RSA public key may be known to the sender and may be used to encrypt a randomly generated traditional shared secret. These two shared secrets may be input to a hash-based key derivation function to generate a hybrid shared secret which can be used as an encryption key to encrypt data by the sender. The receiver may apply similar techniques to derive at the decryption key. In another embodiment, both a sender and a receiver may have traditional (e.g., ECDH) and PQC key pairs and may use them to generate a traditional shared secret and a PQC shared secret. These two shared secrets may be input to a hash-based key derivation function to generate a hybrid shared secret which can be used as an encryption key to encrypt data by the sender. The receiver may apply similar techniques to derive at the decryption key.

Embodiments of the present disclosure disclose distributing a PQC (e.g., Kyber) public key using a certificate that may be directly generated and signed by using a PQC (e.g., Dilithium) signature algorithm. Embodiments of the present disclosure disclose, for the signed and enveloped data of PKCS7, signing data using a traditional algorithm, concatenating the traditional signature to the data, and signing the result of the traditional signature and the data using a PQC signature algorithm. Embodiments of the present disclosure disclose binding to each other between the traditional and PQC certificates.

Figure 1:
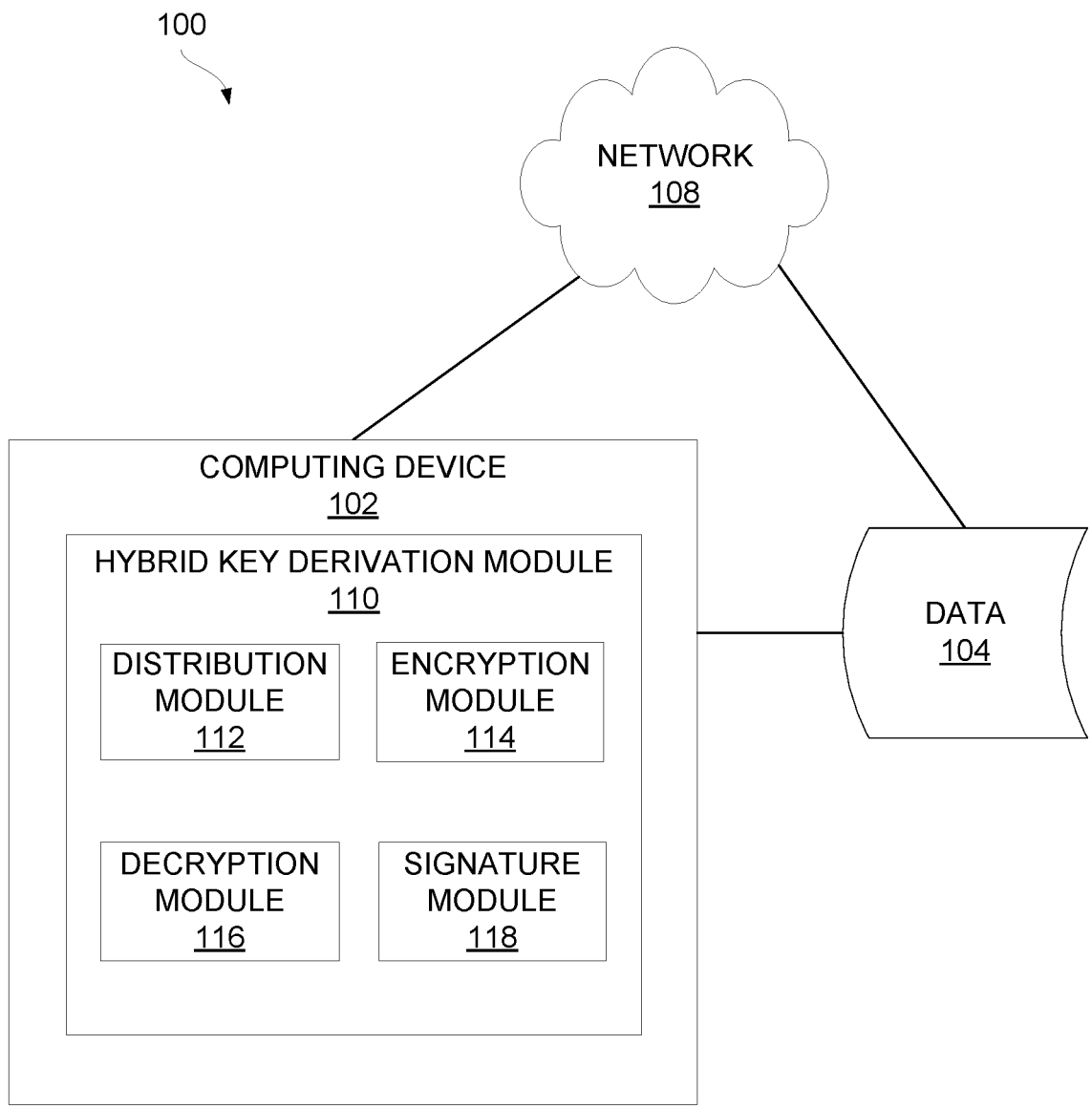
FIG. 1 is a functional block diagram illustrating a hybrid key derivation environment, in accordance with an embodiment of the present disclosure.

The present disclosure will now be described in detail with reference to the Figures. FIG. 1 is a functional block diagram illustrating hybrid key derivation environment, generally designated 100, in accordance with an embodiment of the present disclosure.

In the depicted embodiment, hybrid key derivation environment 100 includes computing device 102, data 104, and network 108. In the depicted embodiment, data 104 is located externally from computing device 102 and accessed through a communication network such as network 108. Data 104 may be accessed directly from computing device 102. In other embodiments, data 104 may be stored and located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to hybrid key derivation module 110 and network 108 and is capable of processing program instructions and executing hybrid key derivation module 110, in accordance with an embodiment of the present disclosure. Computing device 102 may include internal and external hardware components, as depicted and described in further detail with respect to FIG. 9.

Further, in the depicted embodiment, computing device 102 includes hybrid key derivation module 110. In the depicted embodiment, hybrid key derivation module 110 is located on computing device 102. However, in other embodiments, hybrid key derivation module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and hybrid key derivation module 110, in accordance with a desired embodiment of the disclosure.

In one or more embodiments, hybrid key derivation module 110 is configured to publish a traditional public key in a traditional certificate and a PQC public key in a PQC certificate. Hybrid key derivation module 110 may generate a traditional key pair. The traditional key pair may include a traditional private key and the traditional public key. In an example, the traditional key pair may be an RSA key pair. The RSA key pair may be used to encrypt and decrypt data 104. An RSA public key may be known to anyone. An RSA private key needs to be kept private. Messages encrypted using the public key can be decrypted with the private key. In another example, the traditional key pair may be an ECDH key pair. ECDH can be a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. In an example, hybrid key derivation module 110 may generate a Diffie-Hellman ephemeral (DHE) key pair. DHE may be a modification of the Diffie-Hellman key-exchange that uses static keys. A cryptographic key may be called ephemeral if the cryptographic key is generated for each execution of a key-exchange process. In some examples, ephemeral keys may be used more than once, within a single session (e.g., in broadcast applications) where the sender generates only one ephemeral key pair per message and the private key is combined separately with each recipient's public key. Hybrid key derivation module 110 may generate a PQC key pair. The PQC key pair may include a PQC private key and the PQC public key. PQC may refer to cryptographic algorithms that may be secure against an attack by a quantum computer. In an example, PQC may be a secure key encapsulation mechanism (e.g. Kyber), whose security is based on the hardness of solving the learning-with-errors problem over module lattices. A key encapsulation mechanism may be a class of encryption techniques designed to secure symmetric cryptographic key material for transmission using asymmetric (public-key) algorithms. A Kyber key can be used for encryption and decryption. A Kyber public key may be published in a certificate signed with a Dilithium key. For example, Dilithium may be a digital signature scheme that is secure under chosen message attacks based on the hardness of lattice problems over module lattices. Hybrid key derivation module 110 may publish the traditional public key in a traditional certificate for use for encryption. Hybrid key derivation module 110 may publish the PQC public key in a PQC certificate for use for encryption. Hybrid key derivation module 110 may store and secure the traditional private key and the PQC private key.

In one or more embodiments, hybrid key derivation module 110 is configured to encrypt data 104 with a hybrid shared secret. Hybrid key derivation module 110 may generate the hybrid shared secret with a key derivation function by using a traditional shared secret based on the traditional public key and a PQC shared secret based on the PQC public key. In an example, hybrid key derivation module 110 may generate the traditional shared secret randomly. Hybrid key derivation module 110 may encrypt the traditional shared secret with the traditional public key. In an embodiment, the traditional shared secret may be an RSA shared secret. The traditional public key may be an RSA public key. Hybrid key derivation module 110 may derive a PQC shared secret with a PQC public key. Hybrid key derivation module 110 may derive a new PQC public key with a PQC key encapsulation mechanism based on the peer's PQC public key. In an example, the PQC key encapsulation mechanism may be Kyber, whose security may be based on the hardness of solving the learning-with-errors problem over module lattices. Kyber may have different parameter sets aiming at different security levels. For example, Kyber-512 aims at security roughly equivalent to AES-128, Kyber-768 aims at security roughly equivalent to AES-192, and Kyber-1024 aims at security roughly equivalent to AES-256. AES (Advanced Encryption Standard) is a specification for the encryption of electronic data, for example, established by the U.S. National Institute of Standards and Technology. Hybrid key derivation module 110 may generate a hybrid shared secret by using a key derivation function based on the traditional shared secret and the PQC shared secret. In an example, the key derivation function may be a hash-based key derivation function. The hash-based key derivation may be a simple key derivation function based on a hash-based message authentication code. The hash-based key derivation may take an input key and may extract from the input key a fixed-length pseudorandom key. The hash-based key derivation may expand the input key into several additional pseudorandom keys. In an example, the hash-based key derivation may convert shared secrets exchanged via Diffie-Hellman into key material suitable for use in encryption, integrity checking or authentication. Hybrid key derivation module 110 may encrypt data 104 with the hybrid shared secret. Hybrid key derivation module 110 may store the encrypted traditional shared secret, the new PQC public key, and the encrypted data, as an encoding. In an example, the encoding may be a PKCS7 encoding. Hybrid key derivation module 110 may send the PKCS7 encoding to a recipient.

In another example, hybrid key derivation module 110 may use a hybrid key function to generate encryption keys for PKCS7 by combing both traditional ECDH and PQC algorithms. Hybrid key derivation module 110 may generate a new traditional key pair. In an example, the new traditional key pair is an ephemeral DHE key pair. The new traditional key pair may include a new traditional private key and a new traditional public key. Hybrid key derivation module 110 may derive the traditional shared secret with the peer's traditional public key and the new traditional private key. Hybrid key derivation module 110 may discard the new traditional private key. Hybrid key derivation module 110 may derive the PQC shared secret with the PQC public key. Hybrid key derivation module 110 may derive a new PQC public key with a PQC key encapsulation mechanism based on the peer's PQC public key. Hybrid key derivation module 110 may generate the hybrid shared secret by using the key derivation function based on the traditional shared secret and the PQC shared secret. Hybrid key derivation module 110 may encrypt data 104 with the hybrid shared secret. Hybrid key derivation module 110 may store the new traditional public key, the new PQC public key, and the encrypted data, as an encoding. The encoding may be a PKCS7 encoding.

In one or more embodiments, hybrid key derivation module 110 is configured to decrypt data 104 with the hybrid shared secret based on a traditional private key and a PQC private key. In an embodiment, hybrid key derivation module 110 may use a hybrid (e.g., both traditional RSA and PQC) shared secret generation algorithms to decrypt data 104 at rest (e.g., PKCS7). For example, hybrid key derivation module 110 may read an encoding of the encrypted traditional shared secret, the new PQC public key, and the encrypted data. Hybrid key derivation module 110 may decrypt the traditional shared secret with the traditional private key. In an example, the traditional shared secret may be an RSA shared secret. The traditional private key may be an RSA private key. Hybrid key derivation module 110 may derive a PQC shared secret with a new PQC public key and a PQC private key. Hybrid key derivation module 110 may generate the hybrid shared secret with a key derivation function based on the traditional shared secret and the PQC shared secret. In an example, the key derivation function may be a hash-based key derivation function. Hybrid key derivation module 110 may decrypt the encrypted data 104 with the hybrid shared secret. Hybrid key derivation module 110 may secure and restore data 104. In another embodiment, hybrid key derivation module 110 may use a hybrid (e.g., both traditional ECDH and PQC) shared secret generation algorithms to decrypt data 104 at rest (e.g., PKCS7). For example, hybrid key derivation module 110 may read the encoding of the new traditional public key, the new PQC public key, and the encrypted data. Hybrid key derivation module 110 may derive the traditional shared secret (e.g., a traditional ECDH shared secret) with a new traditional public key (e.g., another ECDH public key) and a traditional private key (e.g., an ECDH private key). Hybrid key derivation module 110 may derive the PQC shared secret with a new PQC public key and a PQC private key. Hybrid key derivation module 110 may generate the hybrid shared secret with the key derivation function based on the traditional shared secret and the PQC shared secret. Hybrid key derivation module 110 may decrypt encrypted data 104 with the hybrid shared secret. Hybrid key derivation module 110 may secure and restore data 104.

In one or more embodiments, hybrid key derivation module 110 is configured to sign data 104 with a traditional signature followed by a PQC signature. Hybrid key derivation module 110 may perform certificate validation of a traditional public key and a PQC public key. Hybrid key derivation module 110 may verify the traditional signature with the traditional public key over the data. Hybrid key derivation module 110 may verify the PQC signature with the PQC public key over the data concatenated to the traditional signature. Hybrid key derivation module 110 may distribute a PQC (e.g., Kyber) public key using a certificate that may be directly generated and signed by using a PQC (e.g., Dilithium) signature algorithm. For signed and enveloped data of PKCS7, hybrid key derivation module 110 may sign data using a traditional algorithm, concatenate the traditional signature to the data, and sign the result of the traditional signature and the data using a PQC algorithm. Hybrid key derivation module 110 may bind to each other between the traditional and PQC certificates.

Further, in the depicted embodiment, hybrid key derivation module 110 includes distribution module 112, encryption module 114, decryption module 116, and signature module 118. In the depicted embodiment, distribution module 112, encryption module 114, decryption module 116, and signature module 118 are located on computing device 102. However, in other embodiments, distribution module 112, encryption module 114, decryption module 116, and signature module 118 may be located externally and accessed through a communication network such as network 108.

In one or more embodiments, distribution module 112 is configured to publish a traditional public key in a traditional certificate and a PQC public key in a PQC certificate. Distribution module 112 may generate a traditional key pair. The traditional key pair may include a traditional private key and the traditional public key. In an example, the traditional key pair may be an RSA key pair. The RSA key pair may be used to encrypt and decrypt data 104. An RSA public key may be known to anyone. An RSA private key needs to be kept private. Messages encrypted using the public key can be decrypted with the private key. In another example, the traditional key pair may be an ECDH key pair. ECDH can be a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. In an example, distribution module 112 may generate a DHE key pair. DHE may be a modification of the Diffie-Hellman key-exchange that uses static keys. A cryptographic key may be called ephemeral if the cryptographic key is generated for each execution of a key-exchange process. In some examples, ephemeral keys may be used more than once, within a single session (e.g., in broadcast applications) where the sender generates only one ephemeral key pair per message and the private key is combined separately with each recipient's public key. Distribution module 112 may generate a PQC key pair. The PQC key pair may include a PQC private key and the PQC public key. PQC may refer to cryptographic algorithms that may be secure against an attack by a quantum computer. In an example, PQC may be a secure key encapsulation mechanism (e.g. Kyber), whose security is based on the hardness of solving the learning-with-errors problem over module lattices. A key encapsulation mechanism may be a class of encryption techniques designed to secure symmetric cryptographic key material for transmission using asymmetric (public-key) algorithms. A Kyber key can be used for encryption and decryption. A Kyber public key may be published in a certificate signed with a Dilithium key. For example, Dilithium may be a digital signature scheme that is secure under chosen message attacks based on the hardness of lattice problems over module lattices. Distribution module 112 may publish the traditional public key in a traditional certificate for use for encryption. Distribution module 112 may publish the PQC public key in a PQC certificate for use for encryption. Distribution module 112 may store and secure the traditional private key and the PQC private key.

In one or more embodiments, encryption module 114 is configured to encrypt data 104 with a hybrid shared secret. Encryption module 114 may generate the hybrid shared secret with a key derivation function by using a traditional shared secret based on the traditional public key and a PQC shared secret based on the PQC public key. In an example, encryption module 114 may generate the traditional shared secret randomly. Encryption module 114 may encrypt the traditional shared secret with the traditional public key. In an embodiment, the traditional shared secret may be an RSA shared secret. The traditional public key may be an RSA public key. Encryption module 114 may derive a PQC shared secret with a PQC public key. Encryption module 114 may derive a new PQC public key with a PQC key encapsulation mechanism based on the peer's PQC public key. In an example, the PQC key encapsulation mechanism may be Kyber, whose security may be based on the hardness of solving the learning-with-errors problem over module lattices. Kyber may have different parameter sets aiming at different security levels. For example, Kyber-512 aims at security roughly equivalent to AES-128, Kyber-768 aims at security roughly equivalent to AES-192, and Kyber-1024 aims at security roughly equivalent to AES-256. AES may be a specification for the encryption of electronic data, for example, established by the U.S. National Institute of Standards and Technology. Encryption module 114 may generate a hybrid shared secret by using a key derivation function based on the traditional shared secret and the PQC shared secret. In an example, the key derivation function may be a hash-based key derivation function. The hash-based key derivation may be a simple key derivation function based on a hash-based message authentication code. The hash-based key derivation may take an input key and may extract from the input key a fixed-length pseudorandom key. The hash-based key derivation may expand the input key into several additional pseudorandom keys. In an example, the hash-based key derivation may convert shared secrets exchanged via Diffie-Hellman into key material suitable for use in encryption, integrity checking or authentication. Encryption module 114 may encrypt data 104 with the hybrid shared secret. Encryption module 114 may store the encrypted traditional shared secret, the new PQC public key, and the encrypted data, as an encoding. In an example, the encoding may be a PKCS7 encoding. Encryption module 114 may send the PKCS7 encoding to a recipient.

In another example, encryption module 114 may use a hybrid key function to generate encryption keys for PKCS7 by combing both traditional ECDH and PQC algorithms. Encryption module 114 may generate a new traditional key pair. In an example, the new traditional key pair is an ephemeral DHE key pair. The new traditional key pair may include a new traditional private key and a new traditional public key. Encryption module 114 may derive the traditional shared secret with the peer's traditional public key and the new traditional private key. Encryption module 114 may discard the new traditional private key. Encryption module 114 may derive the PQC shared secret with the PQC public key. Encryption module 114 may derive a new PQC public key with a PQC key encapsulation mechanism based on the peer's PQC public key. Encryption module 114 may generate the hybrid shared secret by using the key derivation function based on the traditional shared secret and the PQC shared secret. Encryption module 114 may encrypt data 104 with the hybrid shared secret. Encryption module 114 may store the new traditional public key, the new PQC public key, and the encrypted data, as an encoding. The encoding may be a PKCS7 encoding.

In one or more embodiments, decryption module 116 is configured to decrypt data 104 with the hybrid shared secret based on a traditional private key and a PQC private key. In an embodiment, decryption module 116 may use a hybrid (e.g., both traditional RSA and PQC) shared secret generation algorithms to decrypt data 104 at rest (e.g., PKCS7). For example, decryption module 116 may read an encoding of the encrypted traditional shared secret, the new PQC public key, and the encrypted data. Decryption module 116 may decrypt the traditional shared secret with the traditional private key. In an example, the traditional shared secret may be an RSA shared secret. The traditional private key may be an RSA private key. Decryption module 116 may derive a PQC shared secret with the peer's new PQC public key and a PQC private key. Decryption module 116 may generate the hybrid shared secret with a key derivation function based on the traditional shared secret and the PQC shared secret. In an example, the key derivation function may be a hash-based key derivation function. Decryption module 116 may decrypt the encrypted data 104 with the hybrid shared secret. Decryption module 116 may secure and restore data 104. In another embodiment, decryption module 116 may use a hybrid (e.g., both traditional ECDH and PQC) shared secret generation algorithms to decrypt data 104 at rest (e.g., PKCS7). For example, decryption module 116 may read the encoding of the new traditional public key, the new PQC public key, and the encrypted data. Decryption module 116 may derive the traditional shared secret (e.g., a traditional ECDH shared secret) with the peer's new traditional public key (e.g., another ECDH public key) and a traditional private key (e.g., an ECDH private key). Decryption module 116 may derive the PQC shared secret with the peer's new PQC public key and a PQC private key. Decryption module 116 may generate the hybrid shared secret with the key derivation function based on the traditional shared secret and the PQC shared secret. Decryption module 116 may decrypt encrypted data 104 with the hybrid shared secret. Decryption module 116 may secure and restore data 104.

In one or more embodiments, signature module 118 is configured to sign data 104 with a traditional signature followed by a PQC signature. Signature module 118 may perform certificate validation of a traditional public key and a PQC public key. Signature module 118 may verify the traditional signature with the traditional public key over the data. Signature module 118 may verify the PQC signature with the PQC public key over the data concatenated to the traditional signature. Signature module 118 may distribute a PQC (e.g., Kyber) public key using a certificate that may be directly generated and signed by using a PQC (e.g., Dilithium) signature algorithm. For signed and enveloped data of PKCS7, Signature module 118 may sign data using a traditional algorithm, concatenate the traditional signature to the data, and sign the result of the traditional signature and the data using a PQC algorithm. Signature module 118 may bind to each other between the traditional and PQC certificates.

Figure 2:
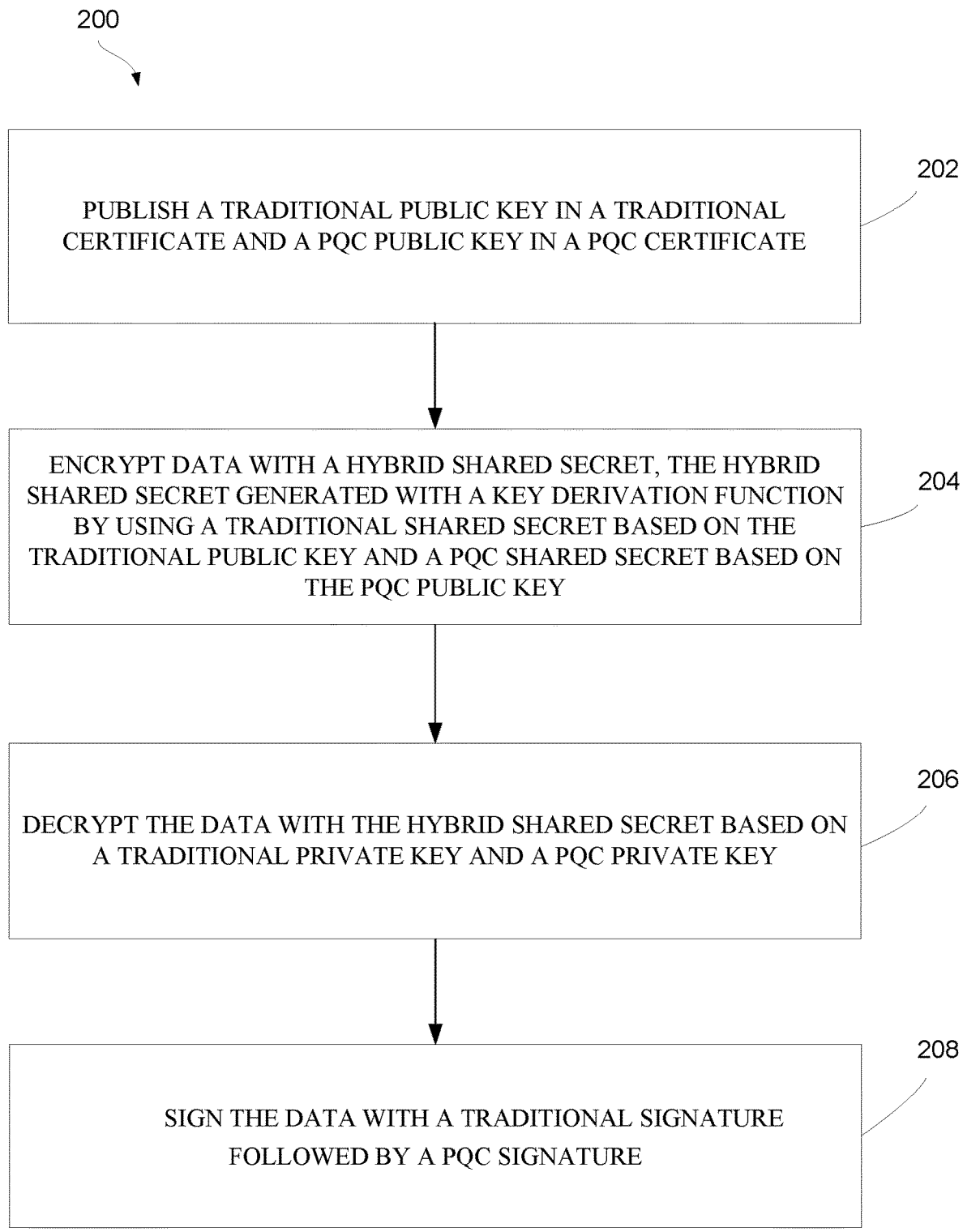
FIG. 2 is a flowchart depicting operational steps of a hybrid key derivation module within a computing device of FIG. 1, in accordance with an embodiment of the present disclosure.

FIG. 2 is a flowchart 200 depicting operational steps of hybrid key derivation module 110 in accordance with an embodiment of the present disclosure.

Hybrid key derivation module 110 operates to publish a traditional public key in a traditional certificate and a PQC public key in a PQC certificate. Hybrid key derivation module 110 also operates to encrypt data 104 with a hybrid shared secret. Hybrid key derivation module 110 may generate the hybrid shared secret with a key derivation function by using a traditional shared secret based on the traditional public key and a PQC shared secret based on the PQC public key. Hybrid key derivation module 110 operates to decrypt data 104 with the hybrid shared secret based on a traditional private key and a PQC private key. Hybrid key derivation module 110 operates to sign data 104 with a traditional signature followed by a PQC signature.

In step 202, hybrid key derivation module 110 publishes a traditional public key in a traditional certificate and a PQC public key in a PQC certificate. Hybrid key derivation module 110 may generate a traditional key pair. The traditional key pair may include a traditional private key and the traditional public key. In an example, the traditional key pair may be an RSA key pair. The RSA key pair may be used to encrypt and decrypt data 104. An RSA public key may be known to anyone. An RSA private key needs to be kept private. Messages encrypted using the public key can be decrypted with the private key. In another example, the traditional key pair may be an ECDH key pair. ECDH can be a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. In an example, hybrid key derivation module 110 may generate a DHE key pair. DHE may be a modification of the Diffie-Hellman key-exchange that uses static keys. A cryptographic key may be called ephemeral if the cryptographic key is generated for each execution of a key-exchange process. In some examples, ephemeral keys may be used more than once, within a single session (e.g., in broadcast applications) where the sender generates only one ephemeral key pair per message and the private key is combined separately with each recipient's public key. Hybrid key derivation module 110 may generate a PQC key pair. The PQC key pair may include a PQC private key and the PQC public key. PQC may refer to cryptographic algorithms that may be secure against an attack by a quantum computer. In an example, PQC may be a secure key encapsulation mechanism (e.g. Kyber), whose security is based on the hardness of solving the learning-with-errors problem over module lattices. A key encapsulation mechanism may be a class of encryption techniques designed to secure symmetric cryptographic key material for transmission using asymmetric (public-key) algorithms. A Kyber key can be used for encryption and decryption. A Kyber public key may be published in a certificate signed with a Dilithium key. For example, Dilithium may be a digital signature scheme that is secure under chosen message attacks based on the hardness of lattice problems over module lattices. Hybrid key derivation module 110 may publish the traditional public key in a traditional certificate for use for encryption. Hybrid key derivation module 110 may publish the PQC public key in a PQC certificate for use for encryption. Hybrid key derivation module 110 may store and secure the traditional private key and the PQC private key.

In step 204, hybrid key derivation module 110 encrypts data 104 with a hybrid shared secret. Hybrid key derivation module 110 may generate the hybrid shared secret with a key derivation function by using a traditional shared secret based on the traditional public key and a PQC shared secret based on the PQC public key. In an example, hybrid key derivation module 110 may generate the traditional shared secret randomly. Hybrid key derivation module 110 may encrypt the traditional shared secret with the traditional public key. In an embodiment, the traditional shared secret may be an RSA shared secret. The traditional public key may be an RSA public key. Hybrid key derivation module 110 may derive a PQC shared secret with a PQC public key. Hybrid key derivation module 110 may derive a new PQC public key with a PQC key encapsulation mechanism based on the PQC public key. In an example, the PQC key encapsulation mechanism may be Kyber, whose security may be based on the hardness of solving the learning-with-errors problem over module lattices. Kyber may have different parameter sets aiming at different security levels. For example, Kyber-512 aims at security roughly equivalent to AES-128, Kyber-768 aims at security roughly equivalent to AES-192, and Kyber-1024 aims at security roughly equivalent to AES-256. AES may be a specification for the encryption of electronic data, for example, established by the U.S. National Institute of Standards and Technology. Hybrid key derivation module 110 may generate a hybrid shared secret by using a key derivation function based on the traditional shared secret and the PQC shared secret. In an example, the key derivation function may be a hash-based key derivation function. The hash-based key derivation may be a simple key derivation function based on a hash-based message authentication code. The hash-based key derivation may take an input key and may extract from the input key a fixed-length pseudorandom key. The hash-based key derivation may expand the input key into several additional pseudorandom keys. In an example, the hash-based key derivation may convert shared secrets exchanged via Diffie-Hellman into key material suitable for use in encryption, integrity checking or authentication. Hybrid key derivation module 110 may encrypt data 104 with the hybrid shared secret. Hybrid key derivation module 110 may store the encrypted traditional shared secret, the new PQC public key, and the encrypted data, as an encoding. In an example, the encoding may be a PKCS7 encoding. Hybrid key derivation module 110 may send the PKCS7 encoding to a recipient.

In another example, hybrid key derivation module 110 may use a hybrid key function to generate encryption keys for PKCS7 by combining both traditional ECDH and PQC algorithms. Hybrid key derivation module 110 may generate a new traditional key pair. In an example, the new traditional key pair is an ephemeral DHE key pair. The new traditional key pair may include a new traditional private key and a new traditional public key. Hybrid key derivation module 110 may derive the traditional shared secret with the traditional public key and the new traditional private key. Hybrid key derivation module 110 may discard the new traditional private key. Hybrid key derivation module 110 may derive the PQC shared secret with the PQC public key. Hybrid key derivation module 110 may derive a new PQC public key with a PQC key encapsulation mechanism based on the peer's PQC public key. Hybrid key derivation module 110 may generate the hybrid shared secret by using the key derivation function based on the traditional shared secret and the PQC shared secret. Hybrid key derivation module 110 may encrypt data 104 with the hybrid shared secret. Hybrid key derivation module 110 may store the new traditional public key, the new PQC public key, and the encrypted data, as an encoding. The encoding may be a PKCS7 encoding.

In step 206, hybrid key derivation module 110 decrypts data 104 with the hybrid shared secret based on a traditional private key and a PQC private key. In an embodiment, hybrid key derivation module 110 may use a hybrid (e.g., both traditional RSA and PQC) shared secret generation algorithms to decrypt data 104 at rest (e.g., PKCS7). For example, hybrid key derivation module 110 may read an encoding of the encrypted traditional shared secret, the new PQC public key, and the encrypted data. Hybrid key derivation module 110 may decrypt the traditional shared secret with the traditional private key. In an example, the traditional shared secret may be an RSA shared secret. The traditional private key may be an RSA private key. Hybrid key derivation module 110 may derive a PQC shared secret with a new PQC public key and a PQC private key. Hybrid key derivation module 110 may generate the hybrid shared secret with a key derivation function based on the traditional shared secret and the PQC shared secret. In an example, the key derivation function may be a hash-based key derivation function. Hybrid key derivation module 110 may decrypt the encrypted data 104 with the hybrid shared secret. Hybrid key derivation module 110 may secure and restore data 104. In another embodiment, hybrid key derivation module 110 may use a hybrid (e.g., both traditional ECDH and PQC) shared secret generation algorithms to decrypt data 104 at rest (e.g., PKCS7). For example, hybrid key derivation module 110 may read the encoding of the new traditional public key, the new PQC public key, and the encrypted data. Hybrid key derivation module 110 may derive the traditional shared secret (e.g., a traditional ECDH shared secret) with a new traditional public key (e.g., another ECDH public key) and a traditional private key (e.g., an ECDH private key). Hybrid key derivation module 110 may derive the PQC shared secret with a new PQC public key and a PQC private key. Hybrid key derivation module 110 may generate the hybrid shared secret with the key derivation function based on the traditional shared secret and the PQC shared secret. Hybrid key derivation module 110 may decrypt encrypted data 104 with the hybrid shared secret. Hybrid key derivation module 110 may secure and restore data 104.

In step 208, hybrid key derivation module 110 signs data 104 with a traditional signature followed by a PQC signature. Hybrid key derivation module 110 may perform certificate validation of a traditional public key and a PQC public key. Hybrid key derivation module 110 may verify the traditional signature with the traditional public key over the data. Hybrid key derivation module 110 may verify the PQC signature with the PQC public key over the data concatenated to the traditional signature. Hybrid key derivation module 110 may distribute a PQC (e.g., Kyber) public key using a certificate that may be directly generated and signed by using a PQC (e.g., Dilithium) signature algorithm. For signed and enveloped data of PKCS7, hybrid key derivation module 110 may sign data using a traditional algorithm, concatenate the traditional signature to the data, and sign the result of the traditional signature and the data using a PQC algorithm. Hybrid key derivation module 110 may bind to each other between the traditional and PQC certificates.

Figure 3:
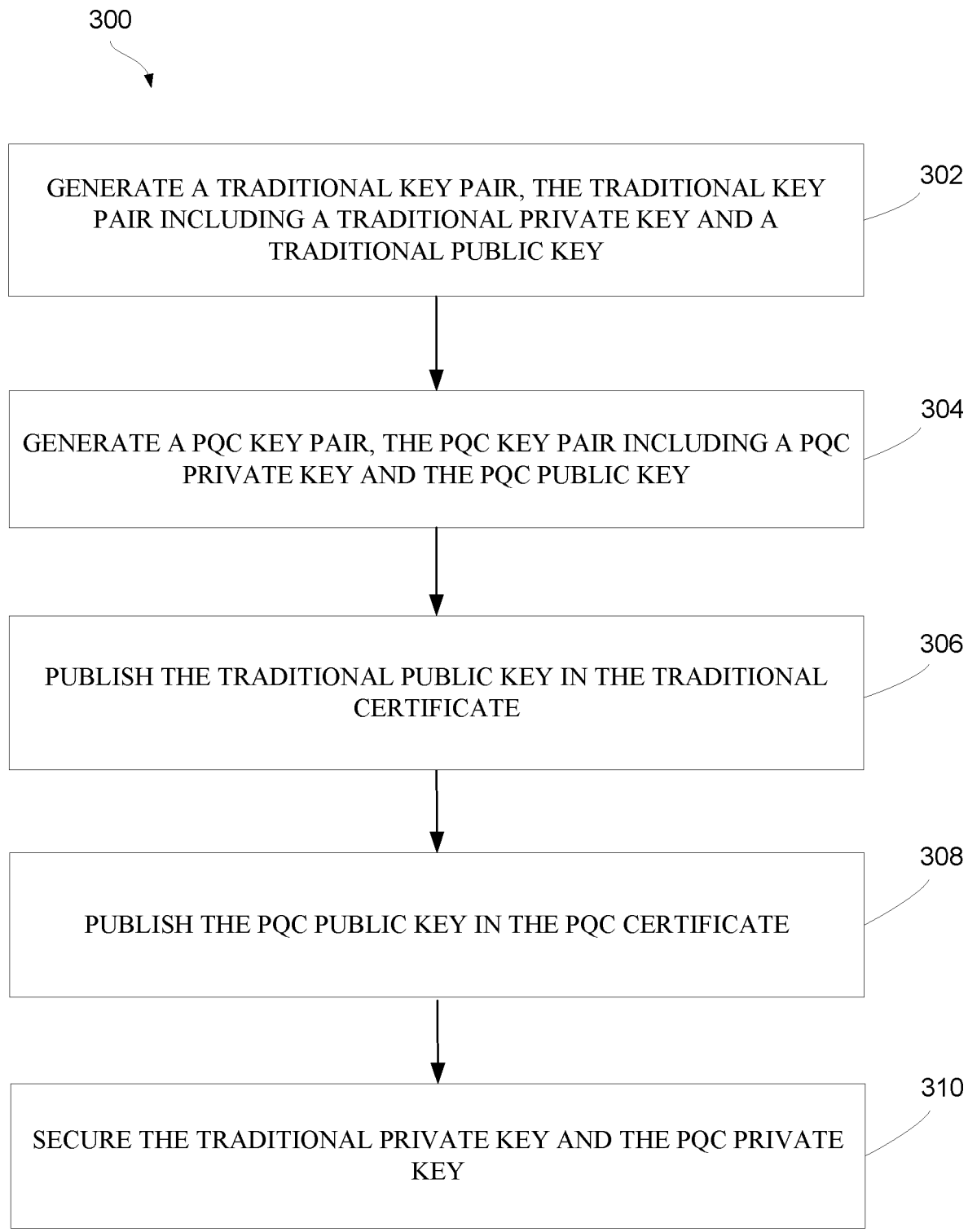
FIG. 3 is a flowchart depicting operational steps of a distribution module of the hybrid key derivation module within the computing device of FIG. 1, in accordance with an embodiment of the present disclosure.

FIG. 3 is a flowchart 300 depicting operational steps of distribution module 112 of hybrid key derivation module 110 in accordance with an embodiment of the present disclosure.

In step 302, distribution module 112 generates a traditional key pair. The traditional key pair may include a traditional private key and a traditional public key. In an example, the traditional key pair may be an RSA key pair. In another example, the traditional key pair may be an ECDH key pair. Distribution module 112 may generate a DHE key pair. In step 304, distribution module 112 generates a PQC key pair. The PQC key pair may include a PQC private key and a PQC public key. In step 306, distribution module 112 publishes the traditional public key in a traditional certificate for use for encryption. In step 308, distribution module 112 publishes the PQC public key in a PQC certificate for use for encryption. In step 310, distribution module 112 secures the traditional private key and the PQC private key. Distribution module 112 may store the traditional private key and the PQC private key.

Figure 4:
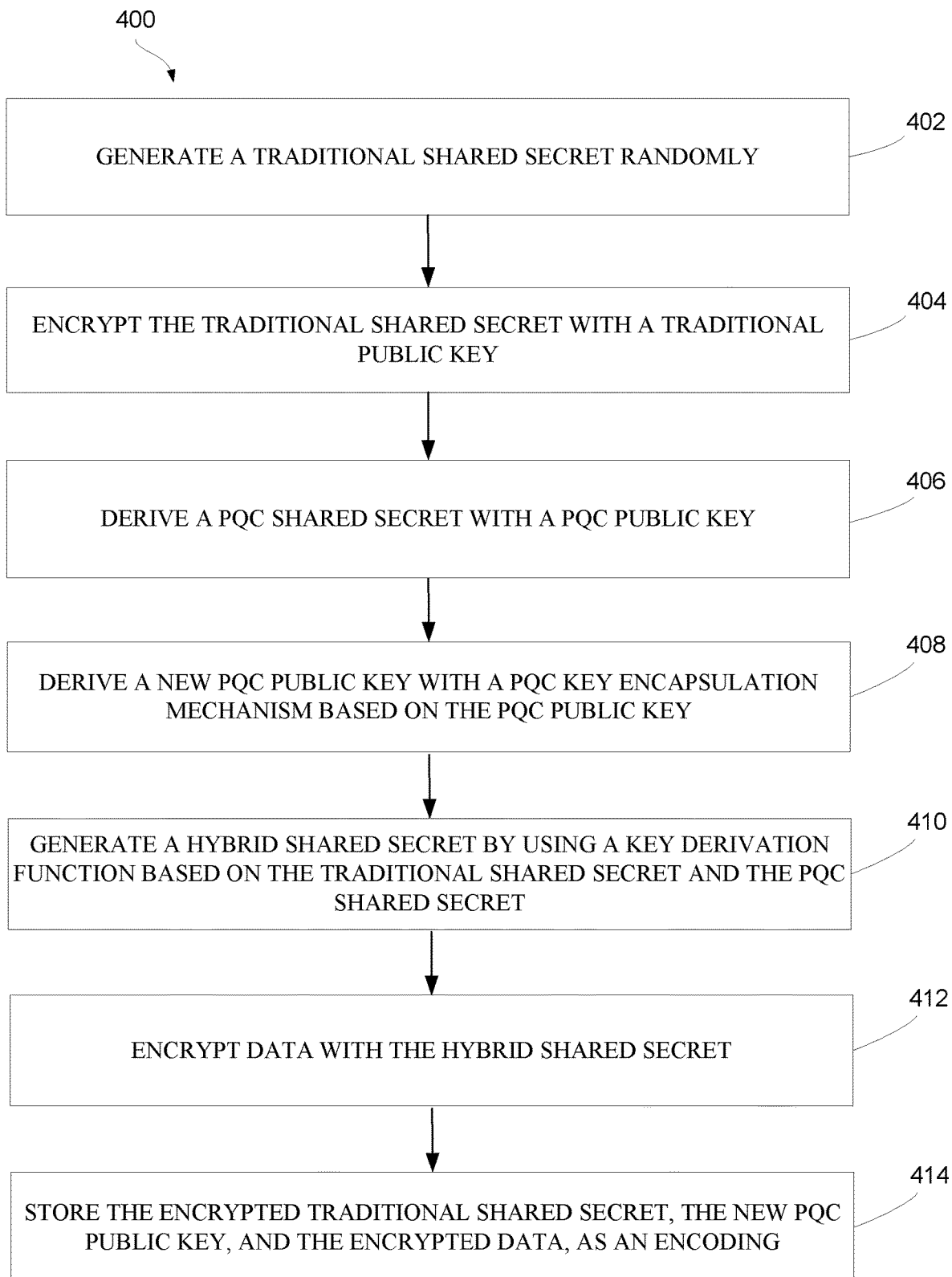
FIG. 4 is a flowchart depicting operational steps of an encryption module of the hybrid key derivation module within the computing device of FIG. 1, in accordance with an embodiment of the present disclosure.

FIG. 4 is a flowchart 400 depicting operational steps of encryption module 114 of hybrid key derivation module 110 in accordance with an embodiment of the present disclosure.

In step 402, encryption module 114 generates a traditional shared secret randomly. In step 404, encryption module 114 encrypts the traditional shared secret with a traditional public key. In an embodiment, the traditional shared secret may be an RSA shared secret. The traditional public key may be an RSA public key. In step 406, encryption module 114 derives a PQC shared secret with a PQC public key. In step 408, encryption module 114 derives a new PQC public key with a PQC key encapsulation mechanism based on the PQC public key. In an example, the PQC key encapsulation mechanism may be Kyber, whose security may be based on the hardness of solving the learning-with-errors problem over module lattices. In step 410, encryption module 114 generates a hybrid shared secret by using a key derivation function based on the traditional shared secret and the PQC shared secret. In an example, the key derivation function may be a hash-based key derivation function. The hash-based key derivation may be a simple key derivation function based on a hash-based message authentication code. In step 412, encryption module 114 encrypts data 104 with the hybrid shared secret. In step 414, encryption module 114 stores the encrypted traditional shared secret, the new PQC public key, and the encrypted data, as an encoding. In an example, the encoding may be a PKCS7 encoding. Encryption module 114 may send the PKCS7 encoding to a recipient.

Figure 5:
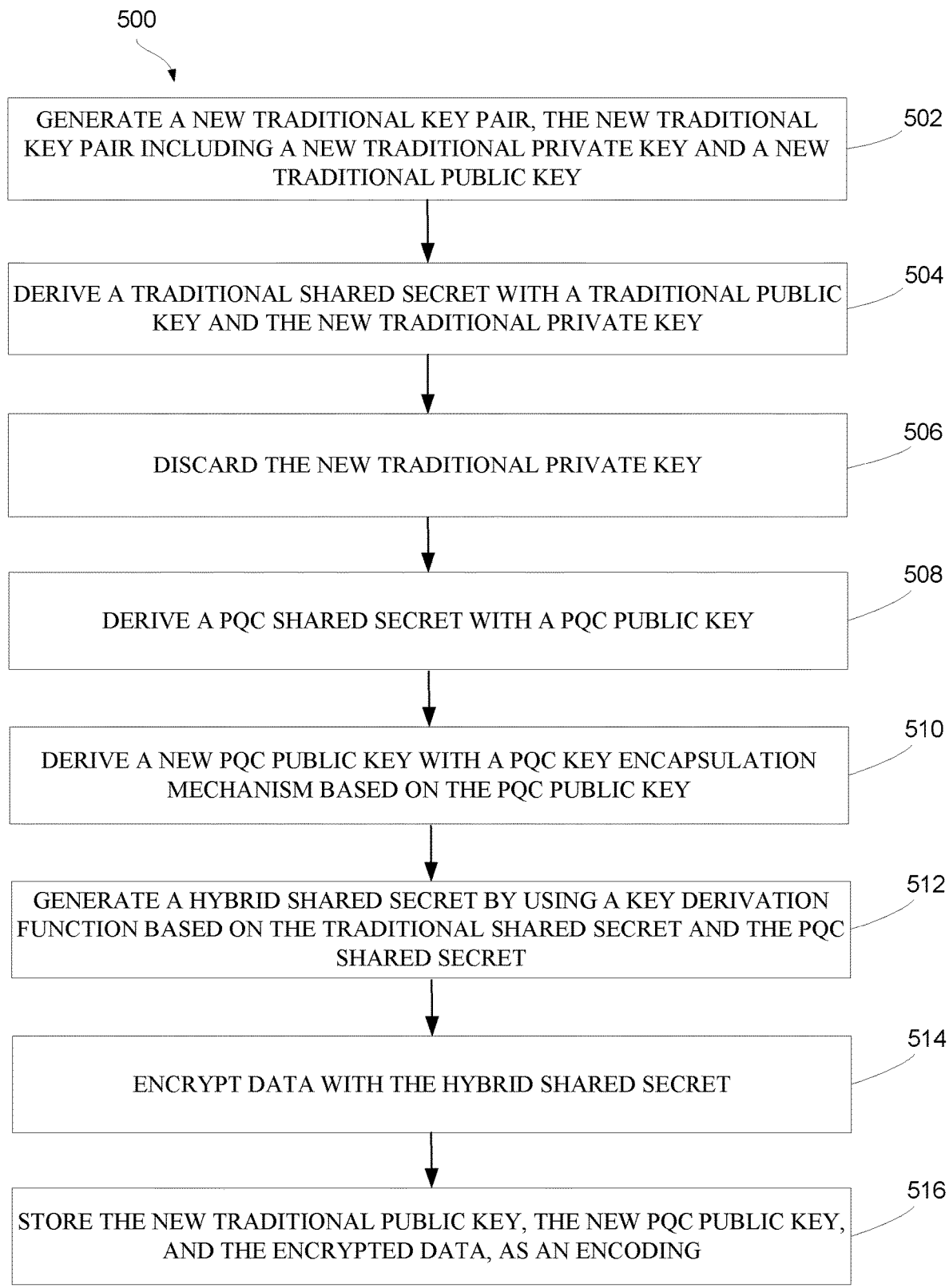
FIG. 5 is another flowchart depicting operational steps of the encryption module of the hybrid key derivation module within the computing device of FIG. 1, in accordance with an embodiment of the present disclosure.

FIG. 5 is another flowchart 500 depicting operational steps of encryption module 114 of hybrid key derivation module 110 in accordance with an embodiment of the present disclosure.

In step 502, encryption module 114 generates a new traditional key pair. In an example, the new traditional key pair is an ephemeral DHE key pair. The new traditional key pair may include a new traditional private key and a new traditional public key. In step 504, encryption module 114 derives a traditional shared secret with a peer's traditional public key and the new traditional private key. In step 506, encryption module 114 discards the new traditional private key. In step 508, encryption module 114 derives a PQC shared secret with a PQC public key. In step 510, encryption module 114 derives a new PQC public key with a PQC key encapsulation mechanism based on the PQC public key. In step 512, encryption module 114 generates a hybrid shared secret by using a key derivation function based on the traditional shared secret and the PQC shared secret. In step 514, encryption module 114 encrypts data 104 with the hybrid shared secret. In step 516, encryption module 114 stores the new traditional public key, the new PQC public key, and the encrypted data, as an encoding. The encoding may be a PKCS7 encoding. Encryption module 114 may send the PKCS7 encoding to a recipient.

Figure 6:
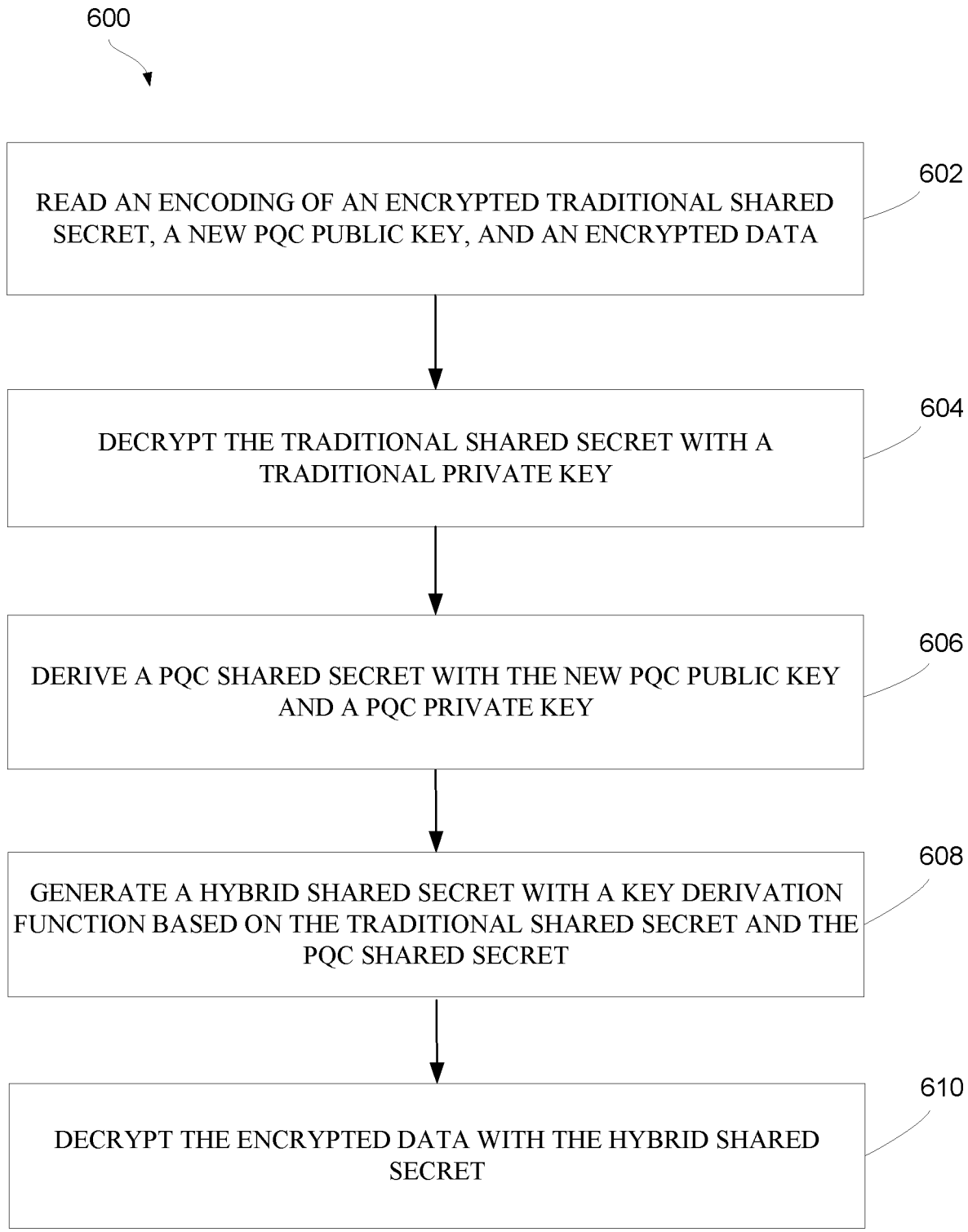
FIG. 6 is a flowchart depicting operational steps of a decryption module of the hybrid key derivation module within the computing device of FIG. 1, in accordance with an embodiment of the present disclosure.

FIG. 6 is a flowchart 600 depicting operational steps of decryption module 116 of hybrid key derivation module 110 in accordance with an embodiment of the present disclosure.

In step 602, decryption module 116 reads an encoding of an encrypted traditional shared secret, a new PQC public key, and an encrypted data. In step 604, decryption module 116 decrypts the encrypted traditional shared secret with a traditional private key. In an example, the traditional shared secret may be an RSA shared secret. The traditional private key may be an RSA private key. In step 606, decryption module 116 derives a PQC shared secret with the new PQC public key and a PQC private key. In step 608, decryption module 116 generates a hybrid shared secret with a key derivation function based on the traditional shared secret and the PQC shared secret. In an example, the key derivation function may be a hash-based key derivation function. In step 610, decryption module 116 decrypts the encrypted data 104 with the hybrid shared secret. Decryption module 116 may secure and restore data 104.

Figure 7:
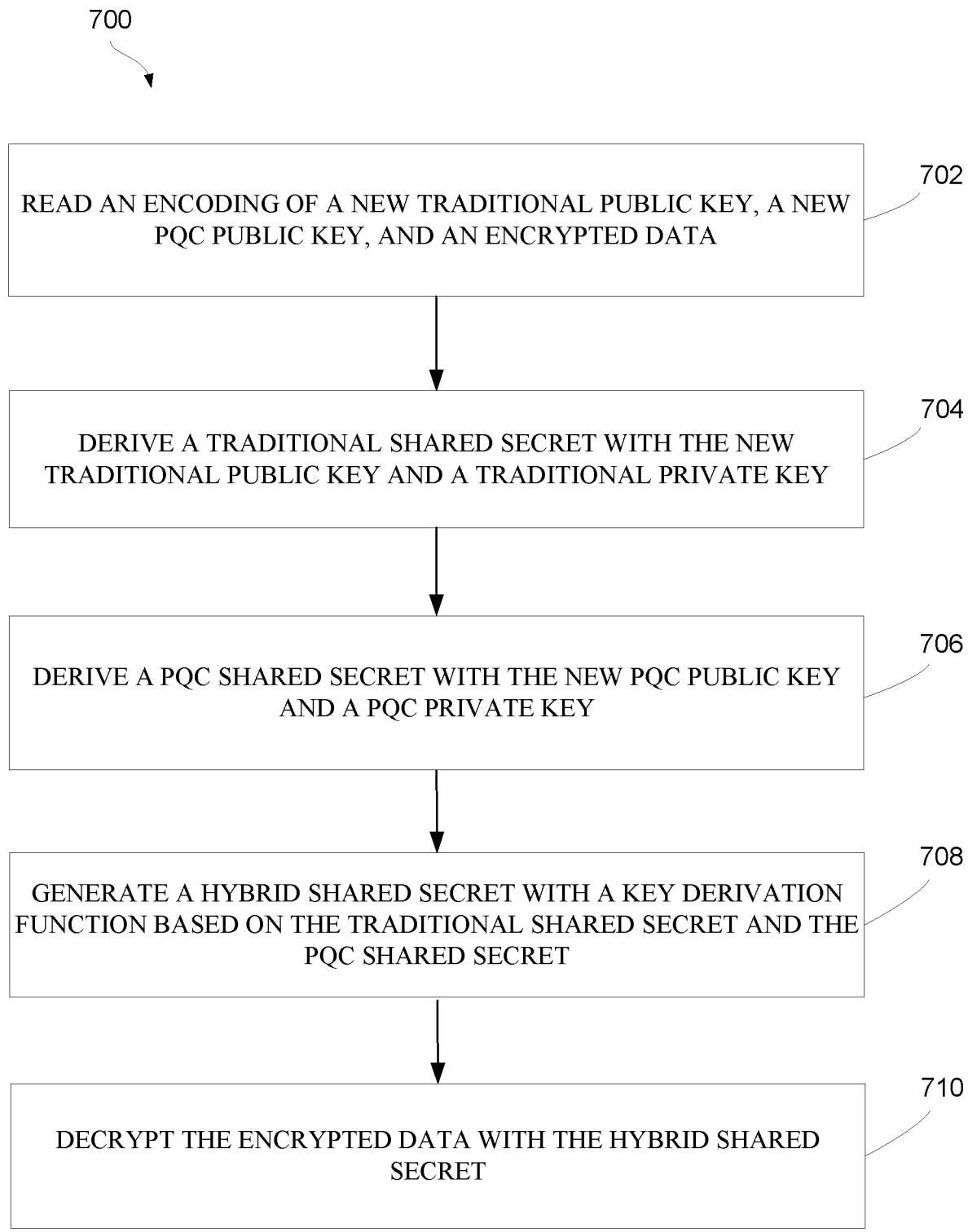
FIG. 7 is another flowchart depicting operational steps of the decryption module of the hybrid key derivation module within the computing device of FIG. 1, in accordance with an embodiment of the present disclosure.

FIG. 7 is another flowchart 700 depicting operational steps of decryption module 116 of hybrid key derivation module 110 in accordance with an embodiment of the present disclosure.

In step 702, decryption module 116 reads an encoding of a new traditional public key, a new PQC public key, and an encrypted data. In step 704, decryption module 116 derives a traditional shared secret (e.g., a traditional ECDH shared secret) with the new traditional public key (e.g., another ECDH public key) and a traditional private key (e.g., an ECDH private key). In step 706, decryption module 116 derives a PQC shared secret with the new PQC public key and a PQC private key. In step 708, decryption module 116 generates a hybrid shared secret with a key derivation function based on the traditional shared secret and the PQC shared secret. In step 710, decryption module 116 decrypts the encrypted data 104 with the hybrid shared secret. Decryption module 116 may secure and restore data 104.

Figure 8:
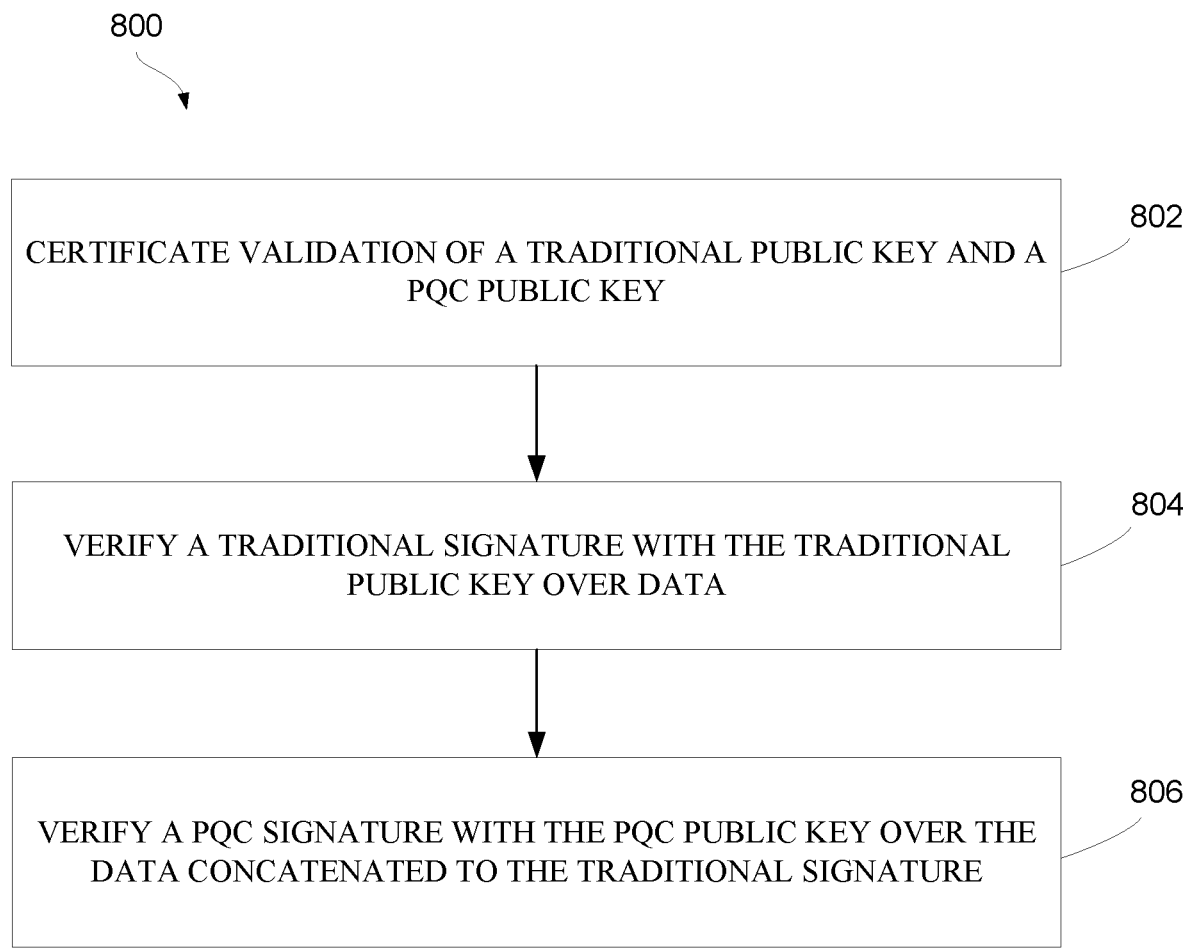
FIG. 8 is a flowchart depicting operational steps of a signature module of the hybrid key derivation module within the computing device of FIG. 1, in accordance with an embodiment of the present disclosure.

FIG. 8 is a flowchart 800 depicting operational steps of signature module 118 of hybrid key derivation module 110 in accordance with an embodiment of the present disclosure.

In step 802, signature module 118 certificates validation of a traditional public key and a PQC public key. In step 804, signature module 118 verifies a traditional signature with the traditional public key over data 104. In step 806, signature module 118 verifies a PQC signature with the PQC public key over data 104 concatenated to the traditional signature. Signature module 118 may distribute a PQC (e.g., Kyber) public key using a certificate that may be directly generated and signed by using a PQC (e.g., Dilithium) signature algorithm. For signed and enveloped data of PKCS7, signature module 118 may sign data using a traditional algorithm, concatenate the traditional signature to the data, and sign the result of the traditional signature and the data using a PQC algorithm. Signature module 118 may bind to each other between the traditional and PQC certificates.

Figure 9:
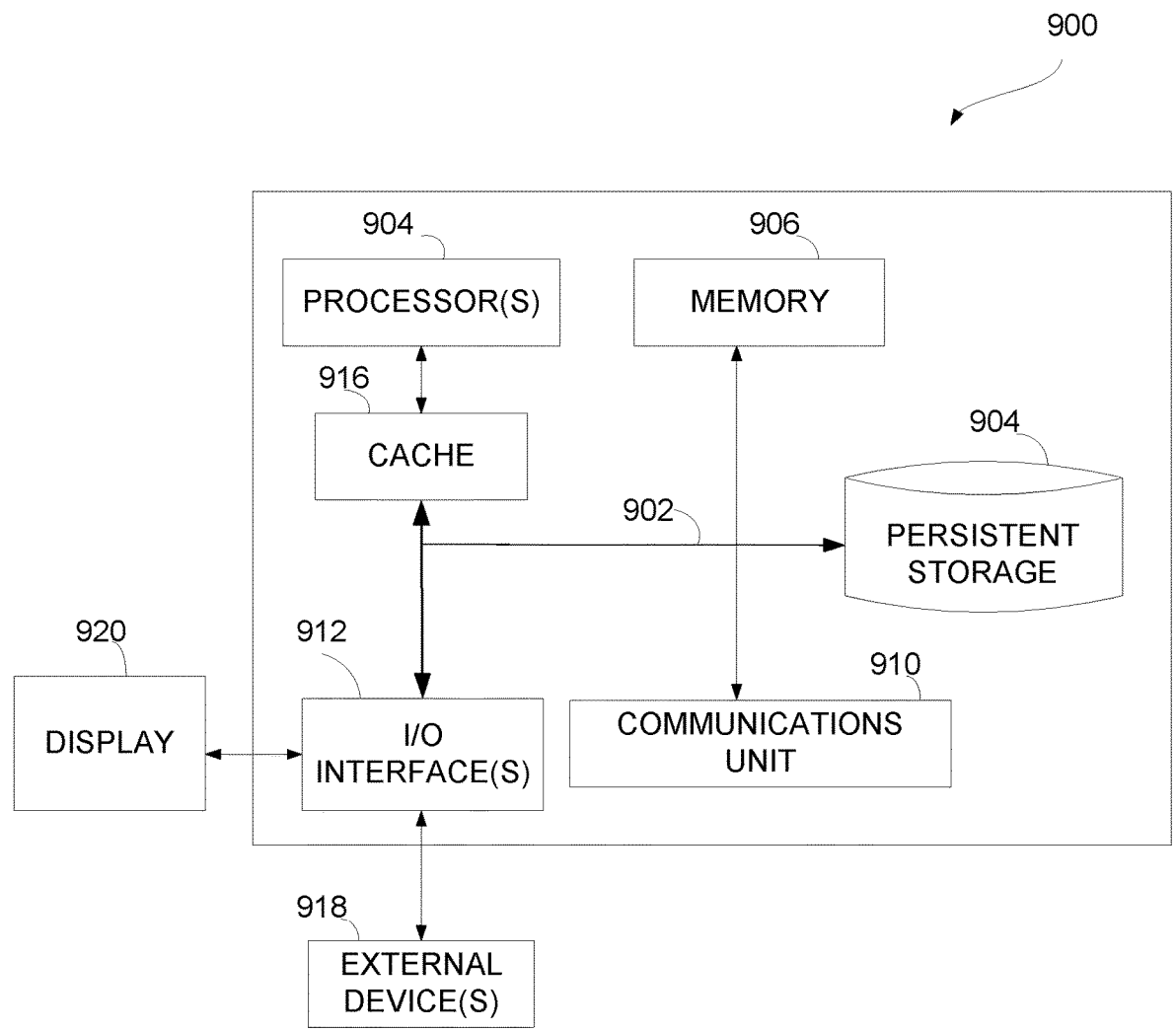
FIG. 9 is a block diagram of components of the computing device of FIG. 1, in accordance with an embodiment of the present disclosure.

FIG. 9 depicts a block diagram 900 of components of computing device 102 in accordance with an illustrative embodiment of the present disclosure. It should be appreciated that FIG. 9 provides only an illustration of one implementation and does not imply any limitations with regard to the environments in which different embodiments may be implemented. Many modifications to the depicted environment may be made.

Computing device 102 may include communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Hybrid key derivation module 110 may be stored in persistent storage 908 and in memory 906 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Hybrid key derivation module 110 may be downloaded to persistent storage 908 through communications unit 910.

I/O interface(s) 912 allows for input and output of data with other devices that may be connected to computing device 102. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., hybrid key derivation module 110 can be stored on such portable computer readable storage media and can be loaded onto persistent storage 908 via I/O interface(s) 912. I/O interface(s) 912 also connect to display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
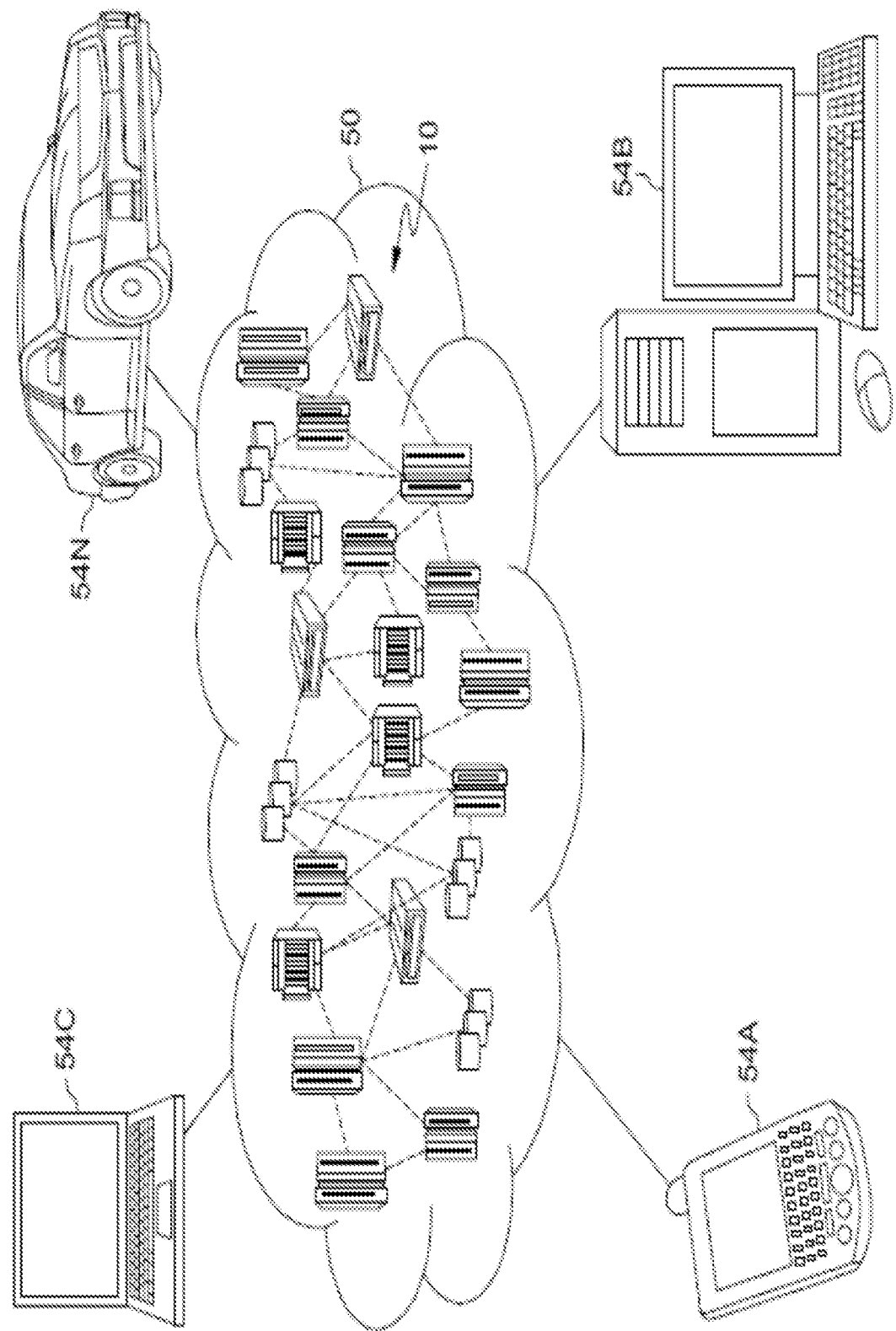
FIG. 10 depicts an embodiment of a cloud computing environment in accordance with the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
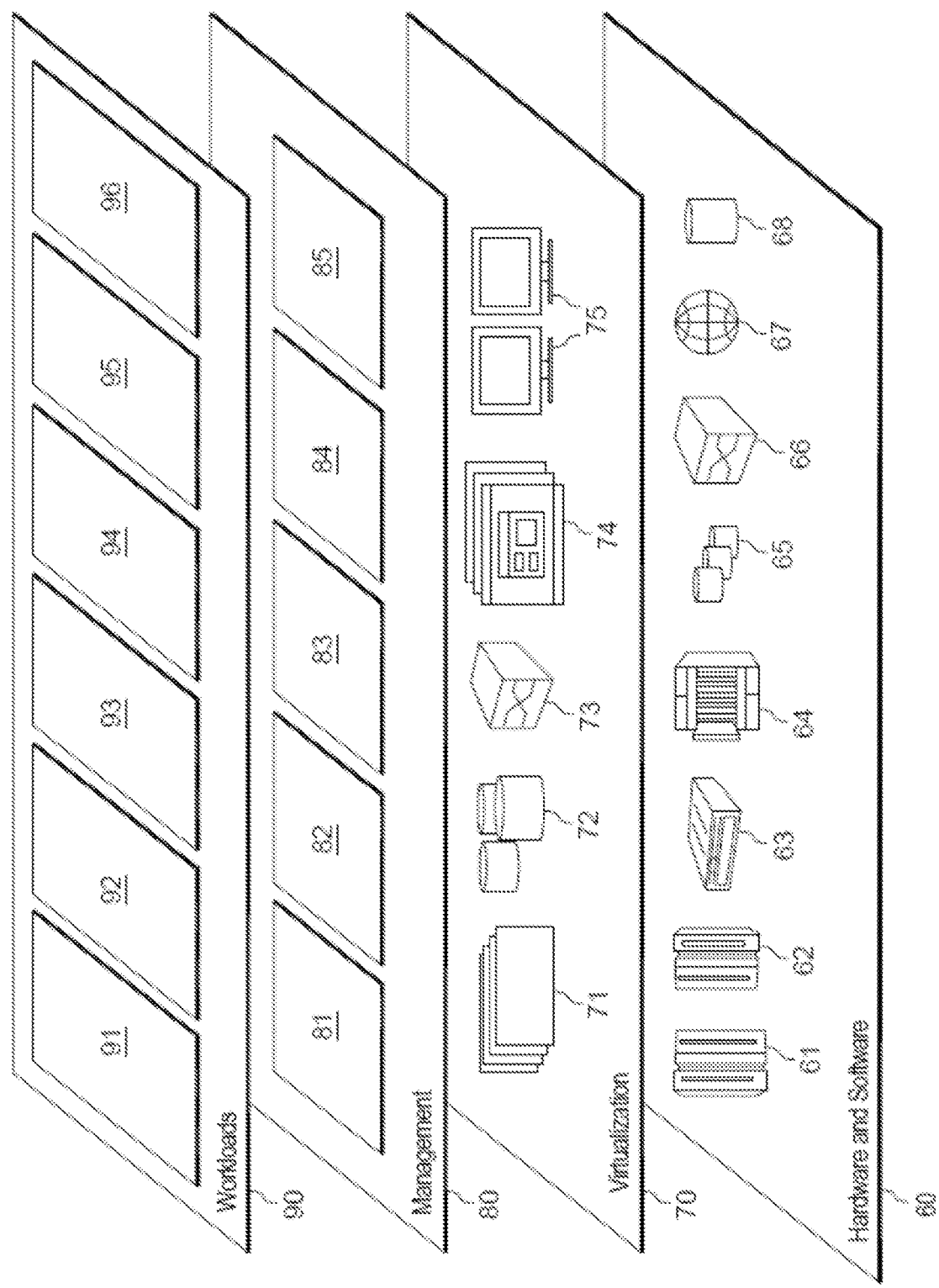
FIG. 11 depicts an embodiment of abstraction model layers of a cloud computing environment, in accordance with the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, hybrid key derivation module 110 as described above with respect to hybrid key derivation environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
  publishing, by one or more processors, a traditional public key in a traditional certificate and a post quantum cryptographic (PQC) public key in a PQC certificate;
  encrypting, by one or more processors, data with a hybrid shared secret, the hybrid shared secret generated with a key derivation function by using a traditional shared secret based on the traditional public key and a PQC shared secret based on the PQC public key, comprising:
    encrypting, by one or more processors, the traditional shared secret with a randomly generated traditional public key;
    deriving, by one or more processors, a new PQC public key with a PQC key encapsulation mechanism based on the PQC public key;
    generating, by one or more processors, the hybrid shared secret by using the key derivation function based on the traditional shared secret and the PQC shared secret; and
    encrypting, by one or more processors, the data with the hybrid shared secret;
  decrypting, by one or more processors, the data with the hybrid shared secret based on a traditional private key and a PQC private key; and
  signing, by one or more processors, the data with a traditional signature followed by a PQC signature.

2. The computer-implemented method of claim 1, wherein publishing the traditional public key and the PQC public key comprises:
  generating a traditional key pair, the traditional key pair including a traditional private key and the traditional public key;
  generating a PQC key pair, the PQC key pair including a PQC private key and the PQC public key;
  publishing the traditional public key in the traditional certificate;
  publishing the PQC public key in the PQC certificate; and
  securing the traditional private key and the PQC private key.

3. The computer-implemented method of claim 1, wherein encrypting the data with the hybrid shared secret comprises:
  deriving the PQC shared secret with the PQC public key; and
  storing the encrypted traditional shared secret, the new PQC public key, and the encrypted data, as an encoding.

4. The computer-implemented method of claim 3, wherein decrypting the data with the hybrid shared secret comprises:
  reading the encoding of the encrypted traditional shared secret, the new PQC public key, and the encrypted data;
  decrypting the traditional shared secret with the traditional private key;
  deriving the PQC shared secret with the new PQC public key and the PQC private key;
  generating the hybrid shared secret with the key derivation function based on the traditional shared secret and the PQC shared secret; and
  decrypting the encrypted data with the hybrid shared secret.

5. The computer-implemented method of claim 1, wherein encrypting the data with the hybrid shared secret comprises:
  generating a new traditional key pair, the new traditional key pair including a new traditional private key and a new traditional public key;
  deriving the traditional shared secret with the traditional public key and the new traditional private key;
  discarding the new traditional private key;
  deriving the PQC shared secret with the PQC public key;
  deriving a new PQC public key with a PQC key encapsulation mechanism based on the PQC public key;

generating the hybrid shared secret by using the key derivation function based on the traditional shared secret and the PQC shared secret;
encrypting the data with the hybrid shared secret; and
storing the new traditional public key, the new PQC public key, and the encrypted data, as an encoding.

6. The computer-implemented method of claim 5, wherein decrypting the data with the hybrid shared secret comprises:
reading the encoding of the new traditional public key, the new PQC public key, and the encrypted data;
deriving the traditional shared secret with the new traditional public key and the traditional private key;
deriving the PQC shared secret with the new PQC public key and the PQC private key;
generating the hybrid shared secret with the key derivation function based on the traditional shared secret and the PQC shared secret; and
decrypting the encrypted data with the hybrid shared secret.

7. The computer-implemented method of claim 1, wherein signing the data with the traditional signature followed by the PQC signature comprises:
certificating validation of the traditional public key and the PQC public key;
verifying the traditional signature with the traditional public key over the data; and
verifying the PQC signature with the PQC public key over the data concatenated to the traditional signature.

8. A computer program product comprising:
one or more computer readable storage media, and program instructions collectively stored on the one or more computer readable storage media, the program instructions comprising:
program instructions to publish a traditional public key in a traditional certificate and a post quantum cryptographic (PQC) public key in a PQC certificate;
program instructions to encrypt data with a hybrid shared secret, the hybrid shared secret generated with a key derivation function by using a traditional shared secret based on the traditional public key and a PQC shared secret based on the PQC public key, comprising:
program instructions to encrypt the traditional shared secret with a randomly generated traditional public key;
program instructions to derive a new PQC public key with a PQC key encapsulation mechanism based on the PQC public key;
program instructions to generate the hybrid shared secret by using the key derivation function based on the traditional shared secret and the PQC shared secret; and
program instructions to encrypt the data with the hybrid shared secret;
program instructions to decrypt the data with the hybrid shared secret based on a traditional private key and a PQC private key; and
program instructions to sign the data with a traditional signature followed by a PQC signature.

9. The computer program product of claim 8, wherein program instructions to publish the traditional public key and the PQC public key comprise:
program instructions to generate a traditional key pair, the traditional key pair including a traditional private key and the traditional public key;
program instructions to generate a PQC key pair, the PQC key pair including a PQC private key and the PQC public key;
program instructions to publish the traditional public key in the traditional certificate;
program instructions to publish the PQC public key in the PQC certificate; and
program instructions to secure the traditional private key and the PQC private key.

10. The computer program product of claim 8, wherein program instructions to encrypt the data with the hybrid shared secret comprise:
program instructions to derive the PQC shared secret with the PQC public key; and
program instructions to store the encrypted traditional shared secret, the new PQC public key, and the encrypted data, as an encoding.

11. The computer program product of claim 10, wherein program instructions to decrypt the data with the hybrid shared secret comprise:
program instructions to read the encoding of the encrypted traditional shared secret, the new PQC public key, and the encrypted data;
program instructions to decrypt the traditional shared secret with the traditional private key;
program instructions to derive the PQC shared secret with the new PQC public key and the PQC private key;
program instructions to generate the hybrid shared secret with the key derivation function based on the traditional shared secret and the PQC shared secret; and
program instructions to decrypt the encrypted data with the hybrid shared secret.

12. The computer program product of claim 8, wherein program instructions to encrypt the data with the hybrid shared secret comprise:
program instructions to generate a new traditional key pair, the new traditional key pair including a new traditional private key and a new traditional public key;
program instructions to derive the traditional shared secret with the traditional public key and the new traditional private key;
program instructions to discard the new traditional private key;
program instructions to derive the PQC shared secret with the PQC public key;
program instructions to derive a new PQC public key with a PQC key encapsulation mechanism based on the PQC public key;
program instructions to generate the hybrid shared secret by using the key derivation function based on the traditional shared secret and the PQC shared secret;
program instructions to encrypt the data with the hybrid shared secret; and
program instructions to store the new traditional public key, the new PQC public key, and the encrypted data, as an encoding.

13. The computer program product of claim 12, wherein program instructions to decrypt the data with the hybrid shared secret comprise:
program instructions to read the encoding of the new traditional public key, the new PQC public key, and the encrypted data;
program instructions to derive the traditional shared secret with the new traditional public key and the traditional private key;
program instructions to derive the PQC shared secret with the new PQC public key and the PQC private key;

program instructions to generate the hybrid shared secret with the key derivation function based on the traditional shared secret and the PQC shared secret; and program instructions to decrypt the encrypted data with the hybrid shared secret.

14. The computer program product of claim 8, wherein program instructions to sign the data with the traditional signature followed by the PQC signature comprise:

program instructions to certificate validation of the traditional public key and the PQC public key;

program instructions to verify the traditional signature with the traditional public key over the data; and program instructions to verify the PQC signature with the PQC public key over the data concatenated to the traditional signature.

15. A computer system comprising:

one or more computer processors, one or more computer readable storage media, and program instructions stored on the one or more computer readable storage media for execution by at least one of the one or more computer processors, the program instructions comprising:

program instructions to publish a traditional public key in a traditional certificate and a post quantum cryptographic (PQC) public key in a PQC certificate;

program instructions to encrypt data with a hybrid shared secret, the hybrid shared secret generated with a key derivation function by using a traditional shared secret based on the traditional public key and a PQC shared secret based on the PQC public key, comprising:

program instructions to encrypt the traditional shared secret with a randomly generated traditional public key;

program instructions to derive a new PQC public key with a PQC key encapsulation mechanism based on the PQC public key;

program instructions to generate the hybrid shared secret by using the key derivation function based on the traditional shared secret and the PQC shared secret; and program instructions to encrypt the data with the hybrid shared secret;

program instructions to decrypt the data with the hybrid shared secret based on a traditional private key and a PQC private key; and program instructions to sign the data with a traditional signature followed by a PQC signature.

16. The computer system of claim 15, wherein program instructions to publish the traditional public key and the PQC public key comprise:

program instructions to generate a traditional key pair, the traditional key pair including a traditional private key and the traditional public key;

program instructions to generate a PQC key pair, the PQC key pair including a PQC private key and the PQC public key;

program instructions to publish the traditional public key in the traditional certificate;

program instructions to publish the PQC public key in the PQC certificate; and program instructions to secure the traditional private key and the PQC private key.

17. The computer system of claim 15, wherein program instructions to encrypt the data with the hybrid shared secret comprise:

program instructions to derive the PQC shared secret with the PQC public key; and program instructions to store the encrypted traditional shared secret, the new PQC public key, and the encrypted data, as an encoding.

18. The computer system of claim 17, wherein program instructions to decrypt the data with the hybrid shared secret comprise:

program instructions to read the encoding of the encrypted traditional shared secret, the new PQC public key, and the encrypted data;

program instructions to decrypt the traditional shared secret with the traditional private key;

program instructions to derive the PQC shared secret with the new PQC public key and the PQC private key;

program instructions to generate the hybrid shared secret with the key derivation function based on the traditional shared secret and the PQC shared secret; and program instructions to decrypt the encrypted data with the hybrid shared secret.

19. The computer system of claim 15, wherein program instructions to encrypt the data with the hybrid shared secret comprise:

program instructions to generate a new traditional key pair, the new traditional key pair including a new traditional private key and a new traditional public key;

program instructions to derive the traditional shared secret with the traditional public key and the new traditional private key;

program instructions to discard the new traditional private key;

program instructions to derive the PQC shared secret with the PQC public key;

program instructions to derive a new PQC public key with a PQC key encapsulation mechanism based on the PQC public key;

program instructions to generate the hybrid shared secret by using the key derivation function based on the traditional shared secret and the PQC shared secret;

program instructions to encrypt the data with the hybrid shared secret; and program instructions to store the new traditional public key, the new PQC public key, and the encrypted data, as an encoding.

20. The computer system of claim 19, wherein program instructions to decrypt the data with the hybrid shared secret comprise:

program instructions to read the encoding of the new traditional public key, the new PQC public key, and the encrypted data;

program instructions to derive the traditional shared secret with the new traditional public key and the traditional private key;

program instructions to derive the PQC shared secret with the new PQC public key and the PQC private key;

program instructions to generate the hybrid shared secret with the key derivation function based on the traditional shared secret and the PQC shared secret; and program instructions to decrypt the encrypted data with the hybrid shared secret.

\* \* \* \* \*